United States Patent
Gupta et al.

(10) Patent No.: US 12,442,647 B2
(45) Date of Patent: Oct. 14, 2025

(54) DEVICES AND METHODS OF DECENTRALIZED ON-DEMAND MULTIVEHICLE DELIVERY

(71) Applicant: Toyota Motor Engineering & Manufacturing North America, Inc., Plano, TX (US)

(72) Inventors: Rohit Gupta, Santa Clara, CA (US); Nejib Ammar, San Jose, CA (US); Akila C. Ganlath, San Jose, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 279 days.

(21) Appl. No.: 18/166,818

(22) Filed: Feb. 9, 2023

(65) Prior Publication Data
US 2024/0271948 A1     Aug. 15, 2024

(51) Int. Cl.
*G01C 21/34*     (2006.01)
*G06N 3/08*      (2023.01)
(Continued)

(52) U.S. Cl.
CPC ..... *G01C 21/3438* (2013.01); *G01C 21/3492* (2013.01); *G06N 3/08* (2013.01); *G06Q 10/02* (2013.01); *G06Q 50/40* (2024.01)

(58) Field of Classification Search
CPC .. G01C 21/3438; G01C 21/3492; G06N 3/08; G06N 3/045; G06Q 10/02; G06Q 50/40; G06Q 10/047
See application file for complete search history.

(56) References Cited

U.S. PATENT DOCUMENTS

| | | |
|---|---|---|
| 9,068,852 B2 | 6/2015 | Mason et al. |
| 9,230,232 B2 | 1/2016 | Mccormick et al. |

(Continued)

FOREIGN PATENT DOCUMENTS

| | | | |
|---|---|---|---|
| CN | 107278312 B | 12/2012 | |
| CN | 108364100 A | * 8/2018 | ........... G06Q 10/047 |
| CN | 109657820 A | * 4/2019 | ............. G06Q 10/02 |

OTHER PUBLICATIONS

EPO machine translated description of cited reference CN-108364100-A. (Year: 2018).*

(Continued)

*Primary Examiner* — Navid Z. Mehdizadeh
*Assistant Examiner* — Shelley Marie Osterhout
(74) *Attorney, Agent, or Firm* — Dinsmore & Shohl LLP (57) ABSTRACT

A computing device and a method to generate a decentralized delivery scheme for multivehicle in an interested area may comprise the following steps. First, the computing device may receive map data, travel request data, and service vehicle data. Second, the computing device may determine one or more constraints based on the travel request data. Third, the computing device may abstract the travel request data, the service vehicle data, and the map data into a request-vehicle graph comprising nodes and edges. Fourth, the computing device may trim the request-vehicle graph into partial request-vehicle graphs for each service vehicle. Fifth, the computing device may encode the partial request-vehicle graphs through a graph neural network (GNN). Sixth, the computing device may train the GNN to predict actions for each service vehicle. Finally, the computing device may instruct the service vehicles to operate based on the actions.

20 Claims, 9 Drawing Sheets

(51) Int. Cl.
*G06Q 10/02* (2012.01)
*G06Q 50/40* (2024.01)

(56) References Cited

U.S. PATENT DOCUMENTS

| | | | |
|---|---|---|---|
| 10,909,494 | B2 | 2/2021 | Lecue et al. |
| 2016/0042303 | A1* | 2/2016 | Medina .......... G06Q 10/063114 705/5 |
| 2017/0352003 | A1 | 12/2017 | Bertoli et al. |
| 2018/0197071 | A1* | 7/2018 | Dong ................ G06Q 30/0202 |
| 2018/0224866 | A1* | 8/2018 | Alonso-Mora ...... G05D 1/0291 |
| 2020/0364627 | A1* | 11/2020 | Qin ........................ G06N 3/084 |
| 2022/0014963 | A1* | 1/2022 | Yeh .......................... G06N 7/01 |
| 2022/0092521 | A1 | 3/2022 | Hunter et al. |
| 2022/0100204 | A1 | 3/2022 | Allybokus |
| 2022/0114033 | A1* | 4/2022 | Arvinte ................ G06F 18/217 |

OTHER PUBLICATIONS

EPO machine translated description of cited reference CN-109657820-A. (Year: 2019).*
Zone pAth Construction (ZAC) based Approaches for Effective Real-Time Ridesharing, Lowalekar, Meghna et al. (Year: 2020).*
Data-driven optimization for last-mile delivery, Hongrui Chu, et al., available at https://link.springer.com/article/10.1007/s40747-021-00293-1 Feb. 22, 2021.

* cited by examiner

DEVICES AND METHODS OF DECENTRALIZED ON-DEMAND MULTIVEHICLE DELIVERY

TECHNICAL FIELD

The embodiments described herein generally relate to managing and optimizing a real-time delivery network, and more particularly, to generating node graphs, computing feasible trips from the node graphs, and assigning trips to vehicles in a delivery network.

BACKGROUND

The efficient and timely transportation of humans and goods presents numerous logistical challenges. For example, transportation companies may invest in a particular number of vehicles in anticipation of transporting and storing various goods, chart routes for the efficient transportation of these goods, generate a logistical supply chain, and adjust delivery schedules based on sudden spikes or reductions in the supply of and/or demand for goods. The ability to provide timely and convenient transportation for delivery of both persons and goods may be affected by the use of smart devices to provide real-time demands to a transportation service system. Accordingly, a need exists for a transportation service system with multivehicle delivery to timely and efficiently provide service in response to demands that may fluctuate in various locations.

SUMMARY

In one embodiment, a method may include receiving map data associated with an interested area, travel request data associated with one or more travel requests, and service vehicle data associated with one or more service vehicles, determining one or more constraints based on the travel request data, abstracting the travel request data, the service vehicle data, and the map data into a request-vehicle graph comprising nodes and edges, the nodes indicating the service vehicles, onboard items, and the travel requests, and the edges comprising request-vehicle edges, onboard-item-vehicle edges, and request-request edges, trimming the request-vehicle graph into partial request-vehicle graphs for each service vehicle, encoding the partial request-vehicle graphs through a graph neural network, training the graph neural network to predict actions for each service vehicle, by maximizing the amount of requests served and minimizing total matching costs of request assignments to the service vehicles according to the map data, where each travel request and each service vehicle satisfy the constraints, and instructing the service vehicles to operate based on the actions.

In another embodiment, a computing device comprising a controller to receive map data associated with an interested area, travel request data associated with one or more travel requests, and service vehicle data associated with one or more service vehicles, to determine one or more constraints based on the travel request data, to abstract the travel request data, the service vehicle data, and the map data into a request-vehicle graph comprising nodes and edges, the nodes indicating the service vehicles, onboard items, and the travel requests, and the edges comprising request-vehicle edges, onboard-item-vehicle edges, and request-request edges, to trim the request-vehicle graph into partial request-vehicle graphs for each service vehicle, to encode the partial request-vehicle graphs through a graph neural network, to train the graph neural network to predict actions for each service vehicle, by maximizing the amount of requests served and minimizing total matching costs of request assignments to the service vehicles according to the map data, where each travel request and each service vehicle satisfy the constraints, and to instruct the service vehicles to operate based on the actions.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Conventional item transport techniques suffer from numerous deficiencies. In particular, conventional transport techniques typically rely on a centralized decision making authority, which often creates inefficiencies due to the existence of a potential single point of failure. In particular, due to reliance on a centralized decision making authority, the ability of conventional transport techniques to address and overcome the adverse effects caused by delays, shortages, and spikes in demand and supply is limited. In particular, the centralized decision making authority may lack the decision making speed for addressing and overcoming such adverse effects. A centralized decision making authority may not pool requests to solve the ride-pooling problem of servicing multiple rides with a single trip and thus may be unable to soften the competitions between the vehicles in the area providing same or similar services.

The decentralized on-demand multivehicle delivery system of the present disclosure is a desirable solution for vehicle-routine optimization for a dynamic pickup and delivery system. In particular, the decentralized on-demand multivehicle delivery system disclosed herein implements a decentralized decision making process that generates a node graph that includes data associated with service vehicles in a network, travel requests, and items to be picked up and on board. The node graph includes a detailed and comprehensive enumeration of proximity based relationships between service vehicles in the system, travel requests, and onboard items. Such a comprehensive node graph is fed as input into a reinforcement learning based graph neural network ("RL-GNN") that obtains one or more actions for one or more of the service vehicles to perform for the purpose of maximizing the service provided and minimizing the delays and dissatisfaction while performing a plurality of requests. As such, it is desirable to adopt a decentralized on-demand multivehicle delivery algorithm to pool travel requests in a large interested area and deliver a real-time booking and service solution.

The decentralized on-demand multivehicle delivery system and method disclosed herein may be used for various ride-sharing multivehicle delivery applications for goods and human transportation. For example, the disclosed decentralized on-demand multivehicle delivery system 100 may be used for last-mile personalized delivery services and on-demand electric vertical takeoff and landing (eVTOL) airline ride share services.

Figure 1:
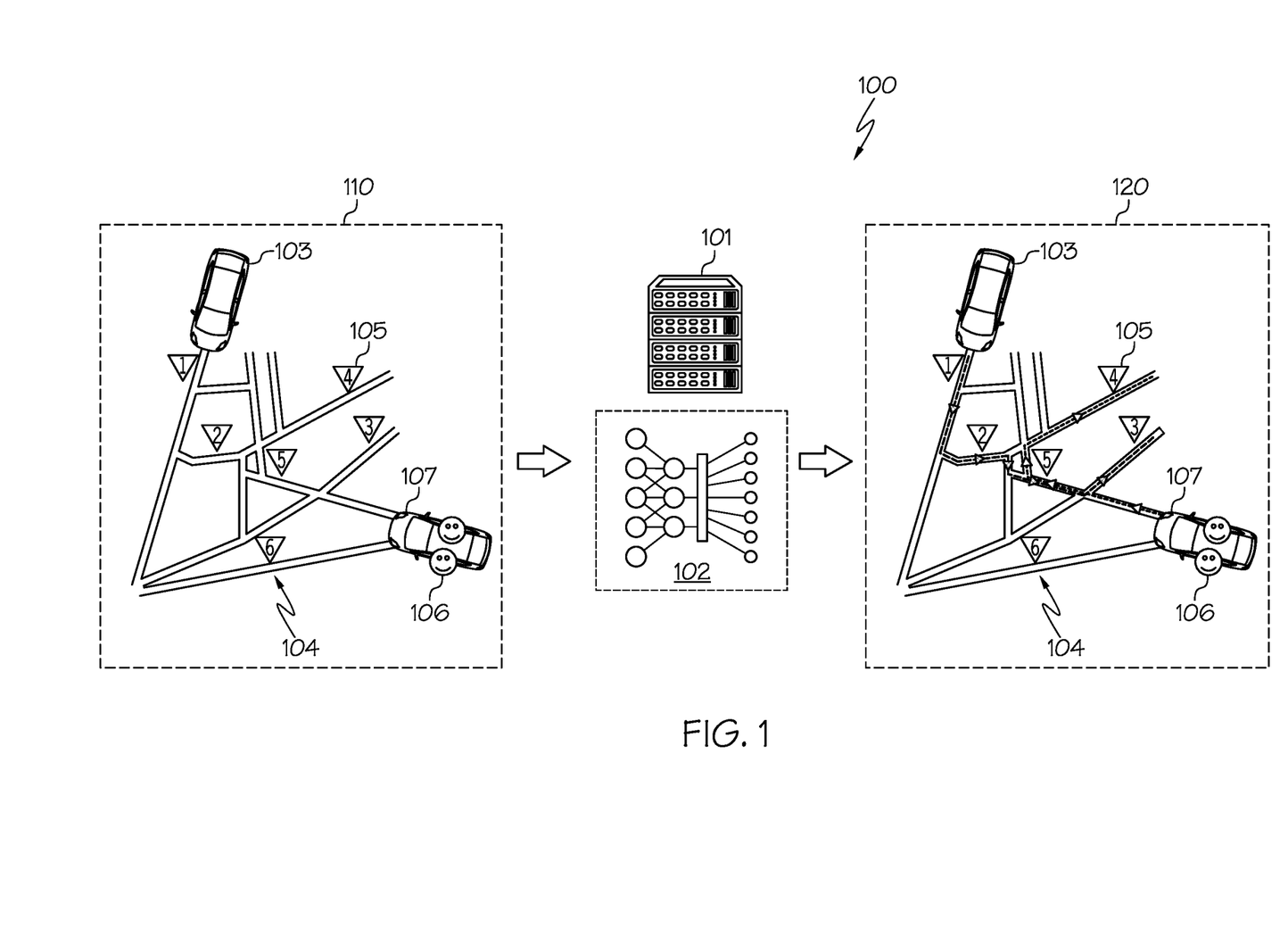
FIG. 1 depicts an example graphical representation of a delivery system for multiple vehicles before and after processing by a decentralized on-demand multivehicle delivery system of the present disclosure, according to one or more embodiments described and illustrated herein.

Turning to the figures, FIG. 1 depicts an example representation of a decentralized on-demand multivehicle delivery system 100, according to one or more embodiments described and illustrated herein. FIG. 1 depicts an example on-demand service situation within an interested area in a map 104. The system 100 includes a server 101, and service vehicles 103 and 107. The server 101 may be a centralized server, an edge server, or a road side unit. The server 101 comprises an encoding module 102. Details of the server 101 and the encoding module 102 are disclosed in further detail below. While the example of FIG. 1 includes two service vehicles 103 and 107, it should be understood that in other examples, the system 100 may include any number of service vehicles.

The decentralized on-demand multivehicle delivery system 100 may receive various data including map data, service vehicle data, and travel request data, which are described in further detail below. In the example of FIG. 1, the as-received various data 110 includes six requests 105, as indicated by the icons of inversed triangular shape, numbered from 1 to 6, located around the roadside within the map 104. However, in other examples, there may be any number of requests. In the example of FIG. 1, the service vehicle 103 has no onboard items, while the service vehicle 107 has two onboard items 106.

In some examples, the service vehicles 103 and 107 may each be an automobile or any other passenger or non-passenger vehicle such as, for example, a terrestrial, aquatic, and/or airborne vehicle. In some examples, the service vehicles 103 and 107 may be unmanned aerial vehicles (UAV), commonly known as drones, that may be able to deliver relatively small and light items. In some examples, the service vehicles 103 and 107 may be electric vertical takeoff and landing (eVTOL) aircrafts providing urban air mobility services.

Each of the service vehicles 103 and 107 may be an autonomous and connected vehicle that navigates its environment with limited human input or without human input. Each of the service vehicles 103 and 107 may be equipped with internet access or other methods of transmitting data and may share data with other devices both inside and outside the service vehicles 103 and 107 (e.g., with the server 101). Each of the service vehicles 103 and 107 may communicate with the server 101 and transmit data to and receive data from the server 101.

In embodiments, items to be picked up by a service vehicle and items on board of a service vehicle may be goods, human beings, pets, or other similar items that may be transported by a service vehicle.

Still referring to FIG. 1, the server 101, upon receiving the data 110, including the map data, the service vehicle data, and the travel request data, creates a node graph and feeds the node graph as input to the encoding module 102 to predict an optimal travel route for the service vehicles 103 and 107 to perform the travel requests 105 in the given map 104. The encoding module 102 generates optimal routes 120 as output, where the service vehicle 103 follows a route to pick up items for travel requests 1, 2, and 3, and the service vehicle 107 follows another route to pick up items for travel requests 5 and 4.

Figure 2:
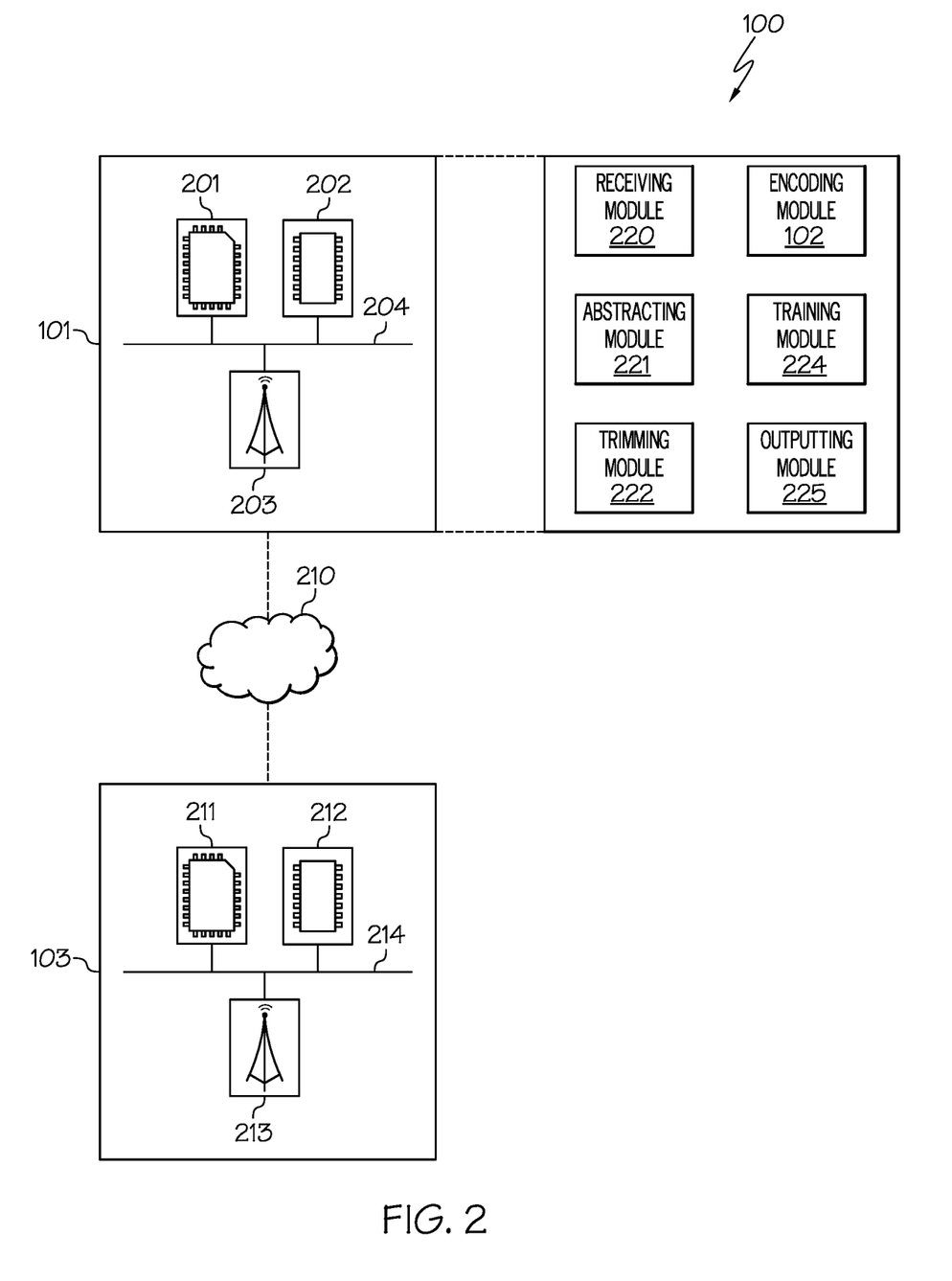
FIG. 2 depicts example non-limiting components of the devices of the decentralized on-demand multivehicle delivery system of the present disclosure, according to one or more embodiments described and illustrated herein.

FIG. 2 schematically depicts non-limiting components of the devices of present disclosure, according to one or more embodiments described and illustrated herein. In particular, FIG. 2 schematically depicts a decentralized on-demand multivehicle delivery system 100, according to one or more embodiments described and illustrated herein that may include the server 101 and each of the service vehicle 103 and 107 illustrated in FIG. 1 and described above.

The server 101 may include one or more controllers 201, one or more memory modules 202, a network interface hardware 203, and a communication path 204 communicatively coupled to the other components of the server 101. The one or more memory modules 202 may store a reinforcement-learning based graphical neural network model. The one or more memory modules 202 may also store travel request data, service vehicle data, map data, and historical restraints. The server 101 may connect with a network 210 that the service vehicle 103 may connect with.

The controller 201 may be any device capable of executing machine readable and executable instructions. Accordingly, the controller 201 may be an integrated circuit, a microchip, a computer, or any other computing device. The controller 201 may serve the role of an encoding module 102 and a training module 224 that is powered by or which implements a reinforcement learning based graphical neural network model as described in the present disclosure. The controller 201 may further serve the role of a receiving module 220, an abstracting module 221, a trimming module 222, and an outputting module 225.

The controller 201 may be coupled to a communication path 204 that provides signal interconnectivity between various modules of the decentralized on-demand multivehicle delivery system 100. Accordingly, the communication path 204 may communicatively couple any number of processors (e.g., comparable to the controller 201) with one another, and allow the modules coupled to the communication path 204 to operate in a distributed computing environment. Specifically, each of the modules may operate as a node that may send and/or receive data. As used herein, the term "communicatively coupled" means that the coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The server 101 may include one or more memory modules 202, which is coupled to the communication path 204. The one or more memory modules 202 may comprise RAM, ROM, flash memories, hard drives, or any device capable of storing machine readable and executable instructions such that the machine readable and executable instructions can be accessed by the controller 201. The one or more memory modules 202 may store a receiving module 220, an abstracting module 221, a trimming module 222, an encoding module 102, a training module 224, and an outputting module 225. The machine readable and executable instructions may comprise logic or algorithm(s) written in any programming language of any generation (e.g., 1GL, 2GL, 3GL, 4GL, or 5GL) such as, for example, machine language that may be directly executed by the controller 201 or assembly language, object-oriented programming (OOP), scripting languages, microcode, etc., that may be compiled or assembled into machine readable and executable instructions and stored on the one or more memory modules 202. Data relating to the moving agents may be stored such as, e.g., primary moving agent designations, secondary moving agent designations, locations of a particular moving agent, and a number of goods that may be carried by a particular moving agent at a given time. Further, data relating to goods carried by moving agents may also be stored, namely data relating to an origin location, a destination, a number of the carried goods, waiting duration, current travel time, shortest travel duration, scheduled travel duration, wait delay tolerance, travel delay tolerance, and so forth.

Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The server 101 may include network interface hardware 203. The network interface hardware 203 is coupled to the communication path 204 such that the communication path 204 communicatively couples the network interface hardware 203 to other modules of the decentralized on-demand multivehicle delivery system 100. The network interface hardware 203 may be any device capable of transmitting and/or receiving data via a wireless network, e.g., the communication network. Accordingly, the network interface hardware 203 may include a communication transceiver for sending and/or receiving data according to any wireless communication standard. For example, the network interface hardware 203 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 203 includes a Bluetooth® transceiver that enables server 101 to transmit and receive information via Bluetooth®. In embodiments, the network interface hardware 203 may transmit data to and receive data from vehicles (e.g., the service vehicle 103 and 107 of FIG. 1).

The network interface hardware 203 may utilize various communication protocols. For example, in embodiments, the network interface hardware 203 may utilize a communication protocol that enables communication between the service vehicle 103 and 107 and the server 101. Compatibility with other comparable communication protocols are also contemplated.

It is noted that communication protocols may include multiple layers as defined by the Open Systems Interconnection Model (OSI model), which defines a telecommunication protocol as having multiple layers, e.g., Application layer, Presentation layer, Session layer, Transport layer, Network layer, Data link layer, and Physical layer. To function correctly, each communication protocol includes a top layer protocol and one or more bottom layer protocols. Examples of top layer protocols (e.g., application layer protocols) include HTTP, HTTP2 (SPDY), and HTTP3 (QUIC), which are appropriate for transmitting and exchanging data in general formats. Application layer protocols such as RTP and RTCP may be appropriate for various real time communications such as, e.g., telephony and messaging. Additionally, SSH and SFTP may be appropriate for secure maintenance, MQTT and AMQP may be appropriate for status notification and wakeup trigger, and MPEG-DASH/HLS may be appropriate for live video streaming with user-end systems. Examples of transport layer protocols that are selected by the various application layer protocols listed above include, e.g., TCP, QUIC/SPDY, SCTP, DCCP, UDP, and RUDP.

Figure 3:
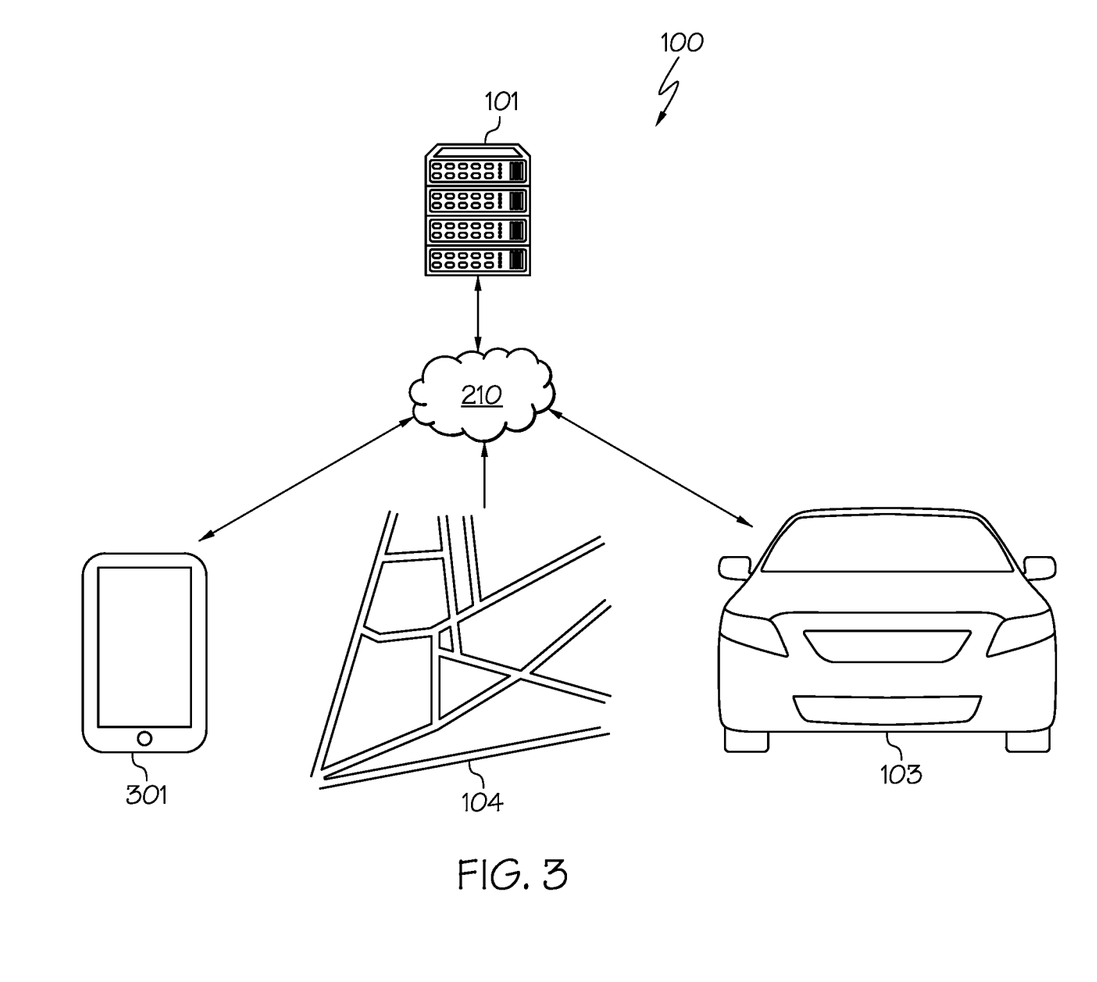
FIG. 3 depicts example non-limiting devices of the decentralized on-demand multivehicle delivery system of the present disclosure, according to one or more embodiments described and illustrated herein.

Still referring to FIG. 2, the service vehicle 103 may include one or more processors 211, one or more memory modules 212, a network interface hardware 213, and a communication path 214 communicatively connected to the other components of the decentralized on-demand multivehicle delivery system 100. The vehicle 103 may connect with a network 210 that the server 101 may connect with. The one or more memory modules 212 may store information about a plurality of travel requests, information about service vehicles, and information about onboard items. The one or more processors 211 may be a controller, an integrated circuit, a microchip, a computer, or any other computing device. The one or more memory modules 212, which is coupled to the communication path 214, may comprise RAM, ROM, flash memories, hard drives, or any device capable of storing machine readable and executable instructions such that the machine readable and executable instructions can be accessed by the one or more processors 211.

The network interface hardware 213 can be communicatively coupled to the communication path 214 and can be any device capable of transmitting and/or receiving data via a network. Accordingly, the network interface hardware 213 can include a communication transceiver for sending and/or receiving any wired or wireless communication. For example, the network interface hardware 213 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 213 includes hardware configured to operate in accordance with the Bluetooth® wireless communication protocol. The network interface hardware 213 of the vehicle 103 may transmit and receive data to and from the server 101 and one or more user request devices (e.g., user request devices 301 of FIG. 3, which are described in further detail below). The service vehicle 107 may be constructed in a similar manner. In some embodiments, the one or more memory modules 212 may include modules similar to the receiving module 220, the abstracting module 221, the trimming module 222, the encoding module 102, the training module 224, and the outputting module 225.

FIG. 3 depicts another example representation of the decentralized on-demand multivehicle delivery system 100. As shown in FIG. 3, the decentralized on-demand multivehicle delivery system 100 may comprise the server 101 connected with a network 210, such as the Internet, to send and receive data to and from other devices in the decentralized on-demand multivehicle delivery system 100, such as the service vehicle 103 and user request devices 301, which are described in further detail below. The server 101 may receive map data 104 associated with an interested area, travel request data associated with one or more travel requests 105, and service vehicle data associated with service vehicles 103.

In embodiments, a user may send a travel request 105 using a user request device 301, such as a smartphone, to the decentralized on-demand multivehicle delivery system 100 via the network 210. The travel request 105 sent to the network 210 may be sent to nearby service vehicles 103 and 107. However, a driver may rely on the decentralized on-demand multivehicle delivery system 100 in determining whether to respond to that request. The server 101 may access map data 104 associated with an interested area through the network 210, such as internet, or in a local data storage device.

The server 101 may include a receiving module 220. For an interested area in the map 104, the receiving module 220 may receive various types of data such as map data, service vehicle data, and travel request data. Map data may comprise information about highways, major roads, minor roads, railways, landmarks, traffic information, point of interests, and information represented on the map. The service vehicle data associated with a service vehicle may comprise a vehicle location, a quantity of onboard items, and information about the onboard items. The information about the onboard items may comprise a drop-off location for the items, a desired travelling time of delivery, and a travel delay tolerance. The travel request data may comprise a quantity of items to be picked up, a pickup time, a pickup location, a drop-off location, a desired travelling time of delivery, a pickup delay tolerance, and a travel delay tolerance. In embodiments, the travel request data may further include personal preferences. The personal preferences may reflect a user's individual preferences with respect to a service provided. The personal preferences may specify preferred delivery providers, vehicle configurations, community choices (e.g., a preference for local drivers), payment methods, health and performance conditions of the drivers, or language spoken by the drivers, and the like. The personal preferences may further include conditions of a vehicle, equipment of a vehicle, DUI status of a driver, Covid-vaccination status of a driver, and the like.

Figure 4:
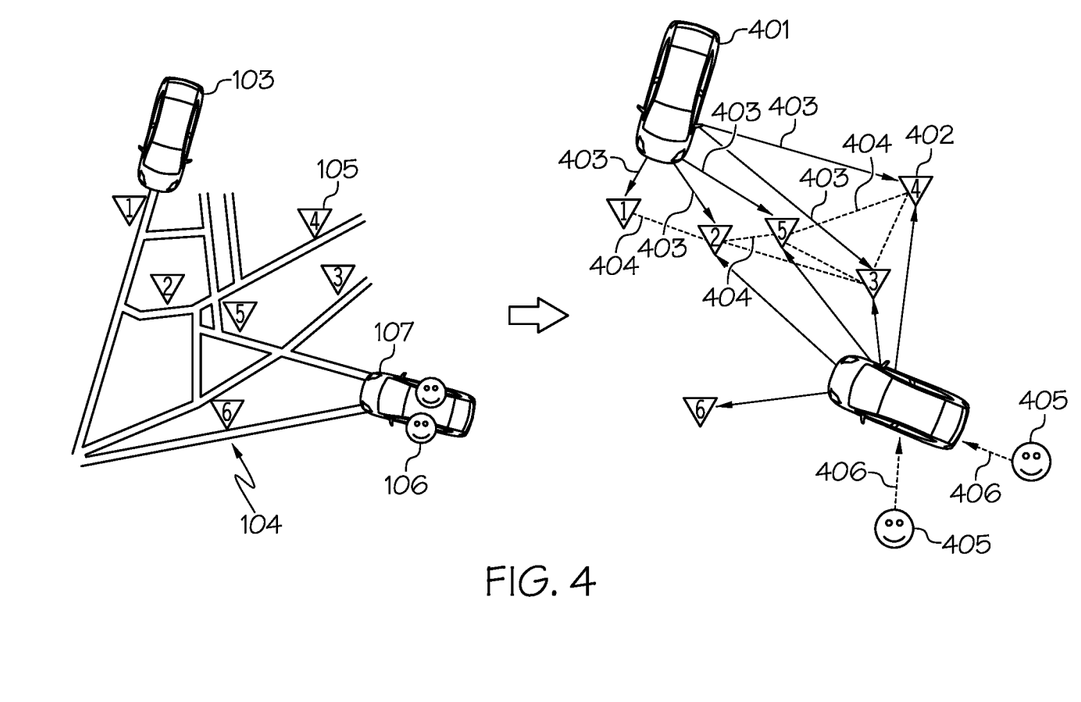
FIG. 4 depicts an example graphical representation of an example abstracting module of the decentralized on-demand multivehicle delivery system of the present disclosure, according to one or more embodiments described and illustrated herein.

FIG. 4 depicts an example use of the abstracting module 221 that abstracts the travel requests and the service vehicles from the map data into a request-vehicle graph. The abstracting module 221, after the receiving module 220 receives map data, travel request data, and service vehicle data, may generate a request-vehicle graph by abstracting the travel request data and the service vehicle data from the map data. In other words, the distances between vehicles, requests, and onboard items in a request-vehicle graph may not represent the real distances between the vehicles, requests, and onboard items. In embodiments, the request-vehicle graph is a node graph with nodes and edges.

The request-vehicle graph may comprise nodes and edges. The nodes may indicate service vehicle nodes 401 representing the service vehicles 103 and 107, onboard item nodes 405 representing the onboard items 106, and travel request nodes 402 representing the travel requests 105. The edges may comprise request-vehicle edges 403, onboard-item-vehicle edges 406, and request-request edges 404. Particularly, the request-vehicle edges 403 may indicate that a service vehicle can serve the travel request while satisfying the constraints based on the travel request data. The onboard-item-vehicle edges 406 may indicate that an item is onboard a service vehicle. The request-request edges 404 may indicate links between paired travel requests where, for each paired travel request, at least one service vehicle can serve the paired travel requests while satisfying the constraints based on the travel request data. For example, as illustrated in FIG. 4, the vehicle 103 may perform the travel requests 1, 2, 5, 3, and 4, and thus, the vehicle 103 and the travel requests 1, 2, 5, 3, and 4 form four request-vehicle edges 403, as indicated as arrow lines from the service vehicle node 401 to the travel request nodes. Further, travel requests may form a pair of travel requests, such as travel requests 1 and 2, 2 and 5, 2 and 3, 3 and 4, and 5 and 4 because each pair can be served by the vehicle 103, illustrated as dashed lines linked between the paired travel requests in FIG. 4. These dashed lines represent the request-request edges 404. For the service vehicle 107, because two onboard items 106 are on its board, there are two onboard-item-vehicle edges 406.

In embodiments, the decentralized on-demand multivehicle delivery system 100 may determine constraints based on the travel requests. The constraints are restrictions applying to all of the service vehicles. The constraints may comprise a maximum pickup delay tolerance, a maximum travel delay tolerance, and a capacity of each service vehicle, among others. The constraint of maximum pickup delay tolerance is the maximum allowed period from a requested pickup time to the actual pickup time of an item. The constraint of maximum travel delay tolerance is the maximum allowed period difference between a desired travelling time and the actual travelling time from the pickup location to the drop-off location. The constraint of capacity of each service vehicle is the maximum quantity of onboard items for that specific service vehicle.

In embodiments, the constraints may be predetermined and stored in the decentralized on-demand multivehicle delivery system 100, such as in the memory modules 202, as historical constraints. The historical constraints are based on the historical travel request data associated with the interested area, and may be updated during training.

Figure 5A:
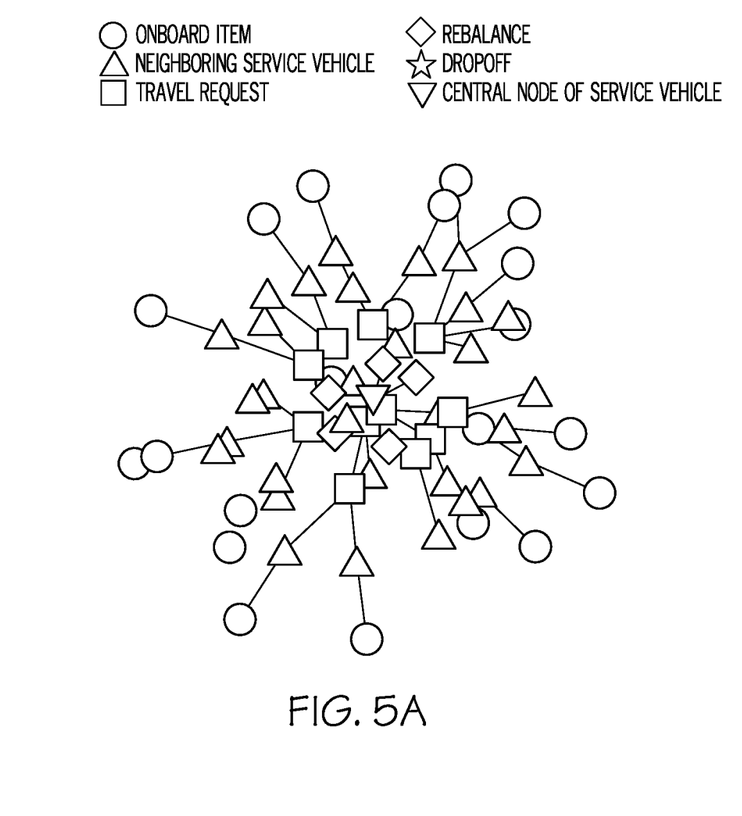
FIG. 5A depicts an example graphical representation of example node graphs without onboard items of the decentralized on-demand multivehicle delivery system of the present disclosure.
Figure 5B:
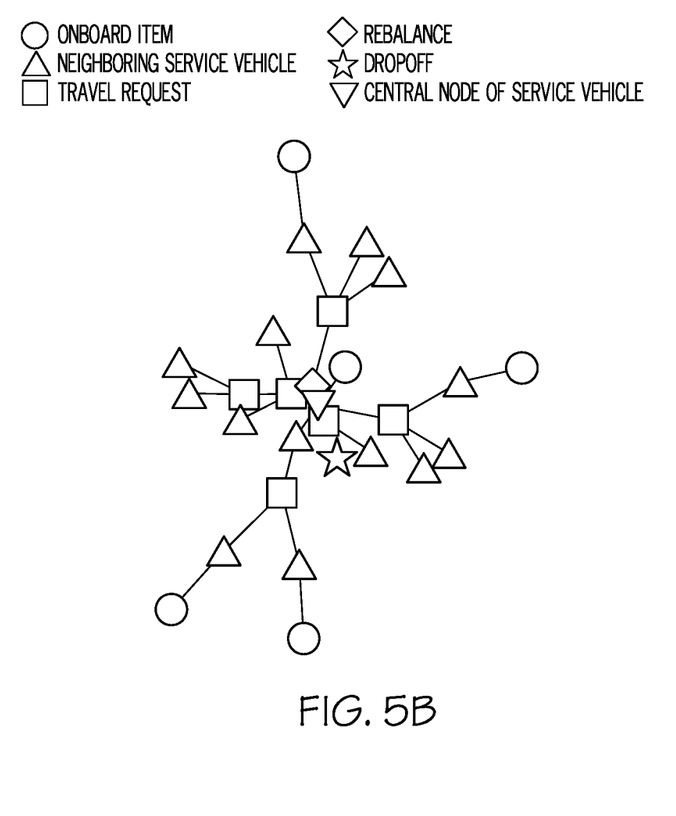
FIG. 5B depicts an example graphical representation of example node graphs without onboard items with onboard items of the decentralized on-demand multivehicle delivery system of the present disclosure, according to one or more embodiments described and illustrated herein.

The request-vehicle graph may further comprise rebalancing nodes for service vehicles that has no onboard items A service vehicle may rebalance to areas with real-time high demands or anticipated high demands of travel request based on historical data. Rebalancing reduces unnecessary competitions and enhances cooperation among the service vehicles. FIG. 5A depicts an example node graph with activities of rebalancing, and FIG. 5B depicts an example node graph without activities of rebalancing. Allowing an unoccupied vehicle having zero onboard item to rebalance counteracts the uneven geographical spread of travel requests and relocates unoccupied vehicles to the areas of higher demand. FIG. 5A illustrates a node graph of a central node of service vehicle that has zero onboard item while FIG. 5B illustrates another node graph of a central node of service vehicle that has at least one onboard item. Comparing FIG. 5A with FIG. 5B, with the optional activity of rebalancing to a new location, the central node of unoccupied vehicle has significantly more connections than the occupied vehicle through the edges to other travel requests and other potential cooperating neighboring service vehicles.

Figure 6:
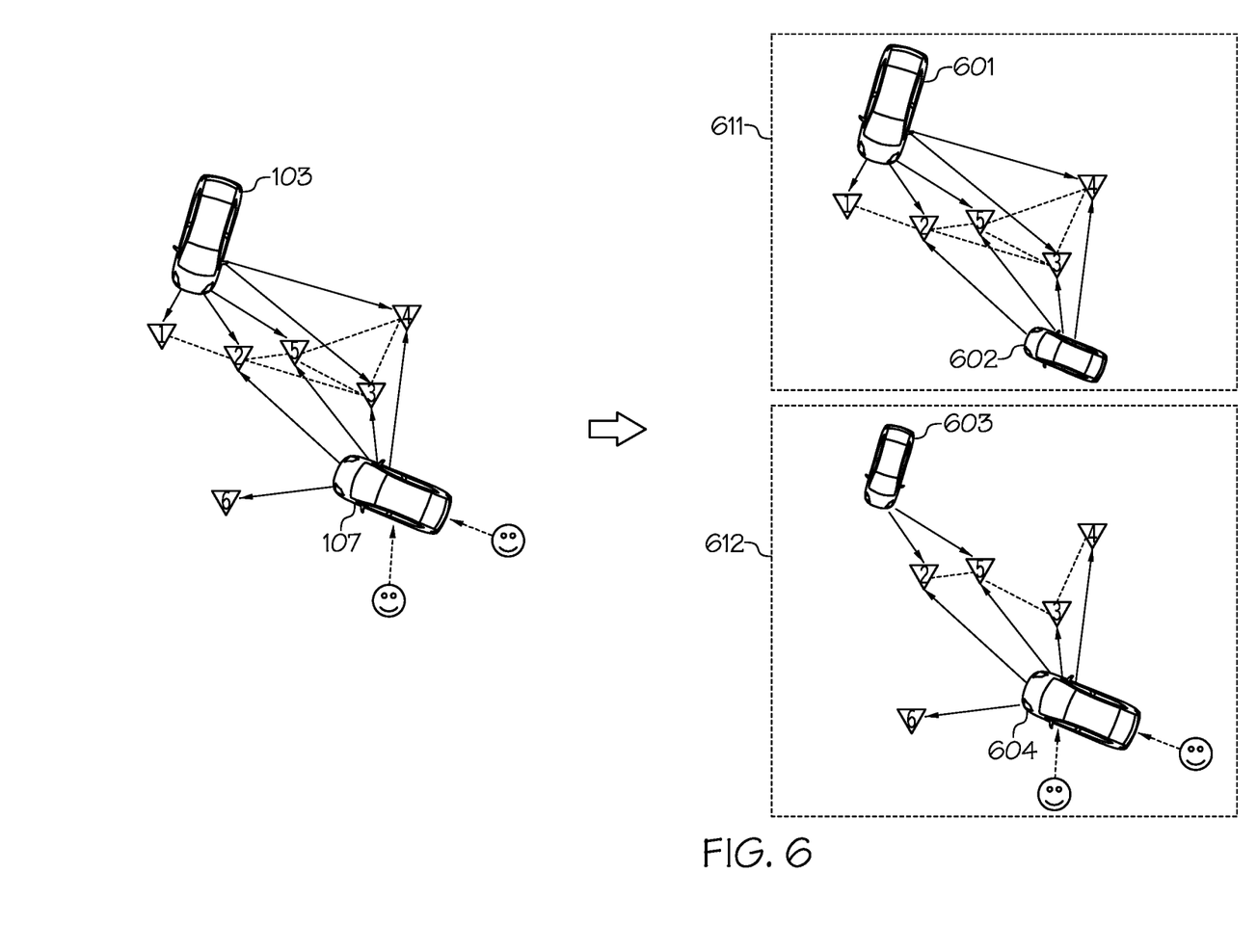
FIG. 6 depicts an example graphical representation of an example trimming module of the decentralized on-demand multivehicle delivery system of the present disclosure, according to one or more embodiments described and illustrated herein.

FIG. 6 depicts an example of trimming a request-vehicle graph into partial request-vehicle graphs for each service vehicle. The decentralized on-demand multivehicle delivery system 100 may include a trimming module. The trimming module may trim the request-vehicle graph into multiple partial request-vehicle graphs, with one partial request-vehicle graph corresponding to one service vehicle. A corresponding partial request-vehicle graph for a vehicle may comprise the nodes and the edges indicating valid travel requests for that vehicle as an ego vehicle and one or more nearby service vehicles as neighboring vehicles that can affect the ego vehicle's actions. For example, in FIG. 6, a partial request-vehicle graph 611 on top right may be generated after trimming a request-vehicle graph by selecting the service vehicle 103 as an ego vehicle 601. The partial request-vehicle graph may eliminate the nodes and edges that may not affect the driver of the ego vehicle 601 in determining which travel request to response and in what manner (e.g. prioritizing the request or another), such as travel request 6, and onboard items on the service vehicle 107 as the neighboring vehicle 602. Similarly, a partial request-vehicle graph 612 is generated after trimming by selecting the service vehicle 107 as the ego vehicle 604 and the service vehicle 107 as the neighboring vehicle 603. In the partial request-vehicle graph 612, travel request 1 is removed from the request-vehicle graph because it may not affect the decision made by the driver of the ego vehicle 604.

Figure 7A:
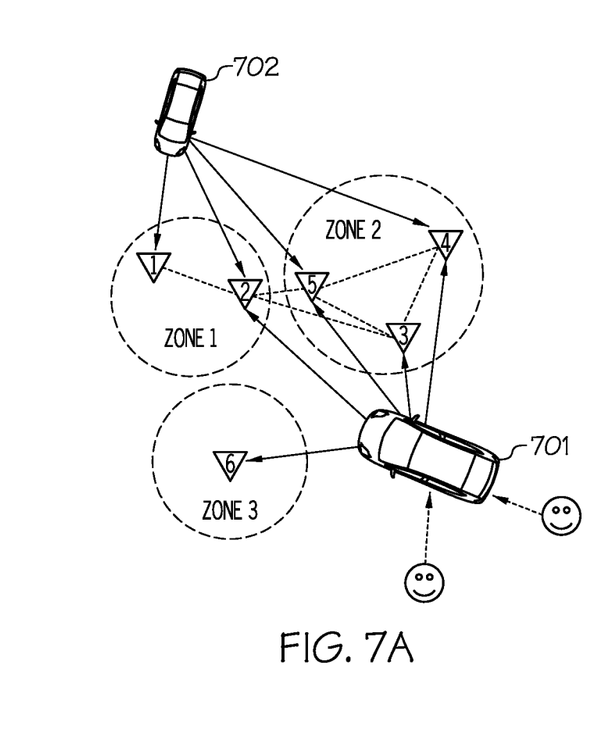
FIG. 7A depicts an example graphical representation of creating zones in an example zoning step in the trimming module of the decentralized on-demand multivehicle delivery system of the present disclosure, according to one or more embodiments described and illustrated herein.
Figure 7B:
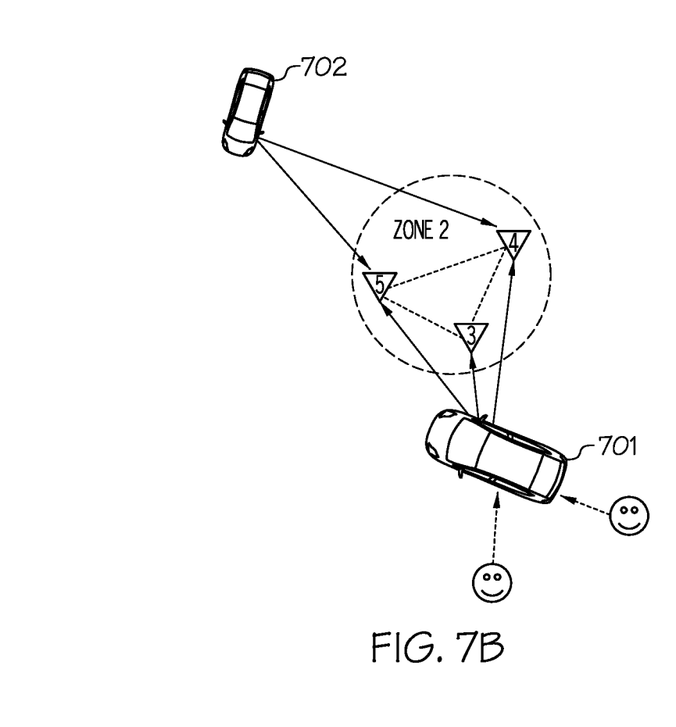
FIG. 7B depicts an example graphical representation of picking a zone in an example zoning step in the trimming module of the decentralized on-demand multivehicle delivery system of the present disclosure, according to one or more embodiments described and illustrated herein.

FIGS. 7A and 7B depict an example of a hierarchical reinforcement learning based framework during the trimming the request-vehicle graph into partial request-vehicle graphs. In embodiments, the trimming module may further include a zoning step, which is described further below. The zoning step may divide the interested area into sub-areas as zones and limit the linking connections to a particular vehicle as an ego vehicle by selecting travel requests based on their locations according to a zone.

In embodiments, the decentralized on-demand multivehicle delivery system 100 may take the zoning step and adopt hierarchical abstract machines to model the partial request-vehicle graphs with following steps. First, as shown in FIG. 7A, the decentralized on-demand multivehicle delivery system 100 may create multiple zones to isolate the travel requests within in a sub-area of the interested area. Second, the decentralized on-demand multivehicle delivery system 100 may select a service vehicle 701 as an ego vehicle (unselected service vehicles are considered as neighboring vehicles, such as the service vehicle 702). Third, the decentralized on-demand multivehicle delivery system 100 may choose a zone for the ego vehicle (e.g. service vehicle 701) where the zone includes at least one request-vehicle edge linking to the service vehicle 701, as shown in FIG. 7B. Fourth, the decentralized on-demand multivehicle delivery system 100 may select the travel requests inside the chosen zone (such as Zone 2 in FIG. 7B). Fifth, the decentralized on-demand multivehicle delivery system 100 may create a partial request-vehicle graph based on the selected travel requests. For example, as illustrated in FIG. 7A, a partial request-vehicle graph is generated corresponding to the service vehicle 701 as the ego vehicle. The decentralized on-demand multivehicle delivery system 100 may divide the interested area into three separate zones, zone 1, zone 2, and zone 3. As illustrated in FIG. 7B, the decentralized on-demand multivehicle delivery system 100 then may pick zone 2 as the chosen zone. The travel requests 3, 4, and 5, which located within the zone 2, may then be the selected travel requests for the encoding purpose.

Figure 8:
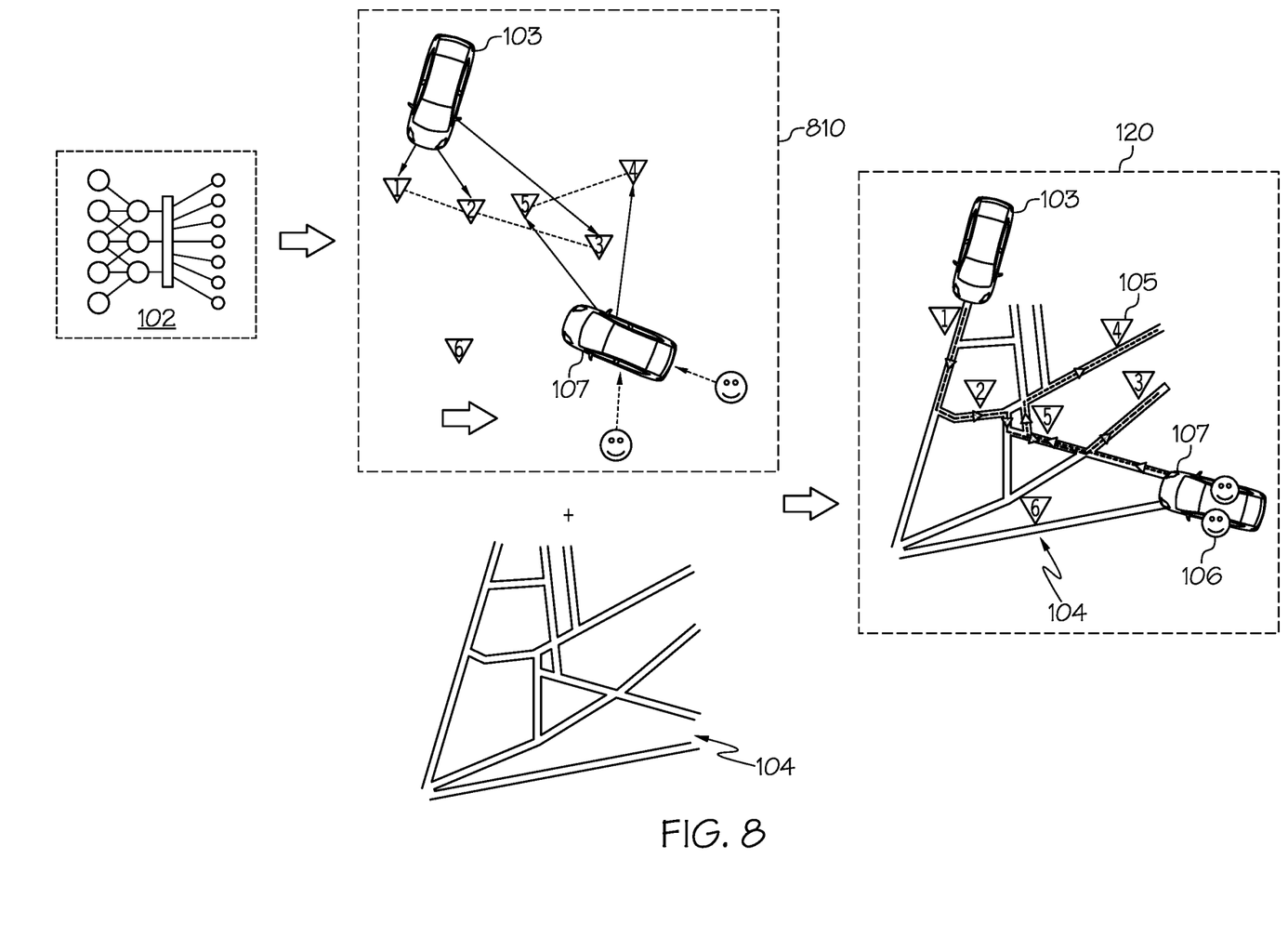
FIG. 8 depicts an example encoding module and outputting module of the decentralized on-demand multivehicle delivery system of the present disclosure, according to one or more embodiments described and illustrated herein.

FIG. 8 illustrates an example of encoding the partial request vehicle graph and outputting the actions of the service vehicles. The decentralized on-demand multivehicle delivery system 100 may include an encoding module 102 and a training module 224. The encoding module 102 may include a graphical neural network (GNN) model implemented by the controllers 201. The request-vehicle graph or the partial request-vehicle graphs may be fed as input to the GNN model. The GNN model may be trained by the training module 224 to predict actions for each service vehicle, reach an optimal scheme comprising travel routes for all service vehicles, and output the optimal scheme comprising the actions for each service vehicle. In embodiments, the server 101 may determine the actions for service vehicles and instruct the service vehicles to operate based on the determined actions. In some embodiments, a service vehicle may determine actions for service vehicles using its encoding module 102 and training module 224, operate according to the determined action for the service vehicle and instruct other service vehicles to operate based on the determined actions.

In embodiments, the encoding module 102 may include a GNN model comprising multiple runs of message passing. A single run of message passing may comprise the following steps. First, the model may embed the nodes and the edges of a node graph in a high-dimensional vector space as messages. Second, the model may pass the messages from neighbor nodes to a central node through the edges. Third, the model may update the messages across all edges through a per-edge update function. Fourth, the model may pass the messages to receiver nodes of the responding edges. Fifth, the model may update the messages across all edges through a per-node update function. Sixth, the model may aggregate the nodes of the onboard items and nodes of the items to be picked up. Seventh, the model may update the receiver nodes with weights following a nonlinear function.

The training module 224 trains the GNN model by maximizing the amount of requests served and minimizing total matching costs of request assignments to the service vehicles according to the map data, where each travel request and each service vehicle satisfy the constraints based on the travel request data and specified by the personal preferences. The total matching costs indicate the total costs of matching the service vehicles and the travel requests considering the total pickup delays, total travel delays, and total personal preference matching costs. During the training, the GNN model may ensure that each travel request and each service vehicle satisfy the constraints.

The actions of a service vehicle may comprise a pickup, a drop-off, and/or a rebalancing. The action of pickup indicates a service vehicle may pick up an item at a travel request location. The action of drop-off indicates a service vehicle with at least one onboard item may drop the onboard item at the drop-off location according to the travel request of the onboard item. The action of rebalancing indicates a service vehicle having no onboard items may travel to another location, usually in an area of more travel requests. As illustrated in FIGS. 5A and 5B, rebalancing allows an unoccupied service vehicle to increase the opportunities to connect with travel requests and cooperate with other service vehicles. A service vehicle with zero onboard item may be assigned an action of pickup, drop-off, or rebalancing, and a service vehicle with one or more onboard items may be assigned an action of pickup or drop-off.

In embodiments, the decentralized on-demand multivehicle delivery system 100 may include an outputting module 225. After training, the GNN model generates an optimal scheme of graph nodes and edges 810. The optimal scheme of graph nodes and edges 810 may be recombined with the map data 104 to generate the optimal routes 120. The outputting module 225 may output the actions for each service vehicle based on the optimal routes 120.

Optimal routes 120 generated by the decentralized on-demand multivehicle delivery system 100 may maximize the overall efficiency and minimize the overall matching costs of providing the requested services. For example, referring to FIG. 8, it is noted that, in the optimal routes 120, although request 5 is located along the route of the service vehicle 103, the optimal routes 120 allow the service vehicle 107 to pick up the items of the travel request because such arrangement may maximize the number of travel requests that can be served. Further, the items of travel request 6 are not arranged to be picked up because satisfying the travel request 6 would lead to higher overall matching costs or hinder the performance of other travel requests. In a situation comprising a large interested area, a greater number of service vehicles, or a greater number of travel requests, the training module 224 may train the GNN to satisfy the most or all of the travel requests without sacrificing any individual travel request. The training module 224 may train the GNN to more highly weight the performance of any individual travel request without sacrificing the overall delivery efficiency and matching costs. By doing so, the decentralized on-demand multivehicle delivery system 100 may have a function of fairness that can be tuned by a system manager.

In embodiments, a fairness function of the decentralized on-demand multivehicle delivery system 100 may further consider the cases of abandoned travel requests and factor the abandoned travel requests into the historical restraints for future optimal route generation schemes.

Figure 9:
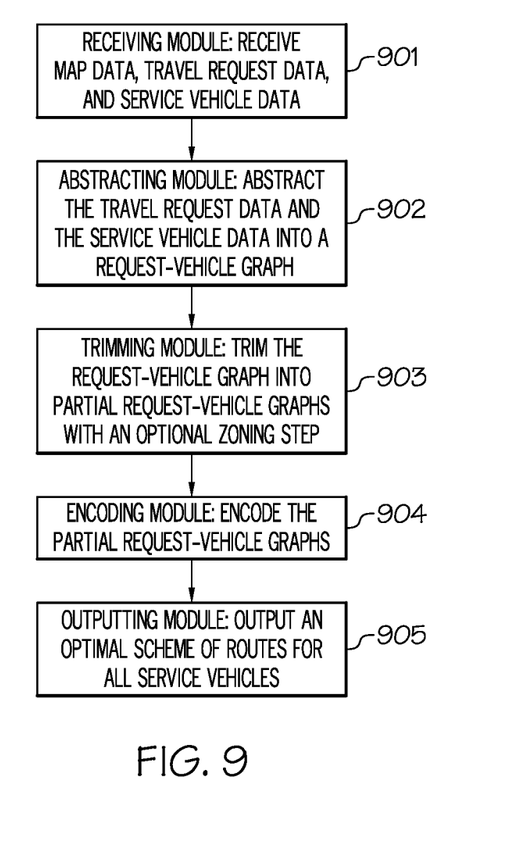
FIG. 9 depicts a flowchart describing operation of the decentralized on-demand multivehicle delivery system, according to one or more embodiments described and illustrated herein.

Referring to FIG. 9 an example flowchart describes the algorithm of the decentralized on-demand multivehicle delivery system 100. In embodiments, at block 901, the receiving module 220 may receive various types of data such as map data, service vehicle data, and travel request data.

In embodiments, at block 902, the abstracting module 221, after the receiving module 220 receives map data, travel request data, and service vehicle data, may generate a request-vehicle graph by abstracting the travel request data and the service vehicle data from the map data.

In embodiments, at block 903, the trimming module may trim the request-vehicle graph into multiple partial request-vehicle graphs, with one partial request-vehicle graph corresponding to one service vehicle. In embodiments, the partial request-vehicle graphs are node graphs with nodes and edges. The trimming module may further include a zoning step that divides the interested area into sub-areas as zones and limit the linking connections to a particular vehicle as an ego vehicle by selecting travel requests based on their locations according to a zone.

In embodiments, at block 904, the request-vehicle graph or the partial request-vehicle graphs may be fed as input to the encoding module 102, which may include a GNN model. The GNN model may be trained by a training module 224 to generate an optimal scheme of routes.

In embodiments, at block 905, the outputting module 225 may output the actions for each service vehicle.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising." or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method comprising:
receiving map data associated with an interested area, travel request data associated with one or more travel requests, and service vehicle data associated with one or more service vehicles;
determining one or more constraints based on the travel request data;
abstracting the travel request data, the service vehicle data, and the map data into a request-vehicle graph comprising nodes and edges, the nodes indicating the service vehicles, onboard items, and the travel requests, and the edges comprising request-vehicle edges, onboard-item-vehicle edges, and request-request edges;
trimming the request-vehicle graph into partial request-vehicle graphs for each service vehicle, wherein the partial request-vehicle graphs comprise a subset of the nodes and the edges of the request-vehicle graphs;
encoding the partial request-vehicle graphs through a graph neural network;
training the graph neural network to predict actions for each service vehicle, by maximizing an amount of requests served and minimizing total matching costs of request assignments to the service vehicles according to the map data, where each travel request and each service vehicle satisfy the constraints; and
operating the service vehicles using instructions based on the actions.

2. The method of claim 1, wherein each travel request comprises a quantity of items to be picked up, a pickup time, a pickup location, a drop-off location, a desired travelling time of delivery, a pickup delay tolerance, or a travel delay tolerance.

3. The method of claim 2, wherein each travel request further comprises personal preferences associated with one or more delivery providers, vehicle configurations, community choices, payment methods, health and performance conditions of drivers of the service vehicles, or languages spoken by the drivers of the service vehicles.

4. The method of claim 3, wherein a total matching cost comprises all the service vehicles' pickup delays, travelling delays, and personal preference matching costs based on the personal preferences.

5. The method of claim 1, wherein the service vehicle data of a service vehicle comprises a vehicle location, a quantity of onboard items, and information about the onboard item.

6. The method of claim 5, wherein the information about the onboard items comprises one or more of a drop-off location, a desired travelling time of delivery, and a travel delay tolerance.

7. The method of claim 1, wherein the constraints comprise one or more of a maximum pickup delay tolerance, a maximum travel delay tolerance, and a capacity of each service vehicle.

8. The method of claim 1, wherein:
the request-vehicle edges indicate that a service vehicle can serve the travel request while satisfying the constraints;
the onboard-item-vehicle edges indicate that an item is onboard a service vehicle; and
the request-request edges indicate links between paired travel requests where, for each paired travel request, at least one service vehicle can perform the paired travel requests while satisfying the constraints.

9. The method of claim 1, wherein a corresponding partial request-vehicle graph for a service vehicle comprises the nodes and the edges indicating valid travel requests for that service vehicle, as an ego vehicle and one or more nearby service vehicles, as neighboring vehicles that can affect the ego vehicle's actions.

10. The method of claim 1, wherein the encoding in the graph neural network comprises multiple runs of message passing, where each run of message passing comprises:
embedding the nodes and the edges in a high-dimensional vector space as messages;
passing the messages from neighbor nodes to a central node through the edges;
updating the messages across all edges through a per-edge update function;
passing the messages to receiver nodes of the corresponding edges;
updating the messages across all edges through a per-node update function;
aggregating the nodes of the onboard items and nodes of the items to be picked up; and
updating the receiver nodes with weights following a nonlinear function.

11. The method of claim 1, wherein the actions of the service vehicles comprise one or more of pickup, drop-off, and rebalancing, where a service vehicle with zero onboard item is assigned an action of pickup, drop-off, or rebalancing, and a service vehicle with one or more onboard items is assigned an action of pickup or drop-off.

12. The method of claim 1, wherein the constraints are further modified based on historical constraints in the interested area, where the training of graph neural network updates the historical constraints.

13. The method of claim 1, wherein trimming the request-vehicle graph into the partial request-vehicle graphs further comprises:
creating multiple zones to isolate the travel requests within a sub-area of the interested area;
selecting a service vehicle as an ego vehicle;
choosing a zone for the ego vehicle where the zone includes at least one request-vehicle edge linking to the ego vehicle;
selecting the travel requests inside the chosen zone; and
creating a request-vehicle graph based on the selected travel requests.

14. A computing device comprising a controller to:
receive map data associated with an interested area, travel request data associated with one or more travel requests, and service vehicle data associated with one or more service vehicles;
determine one or more constraints based on the travel request data;
abstract the travel request data, the service vehicle data, and the map data into a request-vehicle graph comprising nodes and edges, the nodes indicating the service vehicles, onboard items, and the travel requests, and the edges comprising request-vehicle edges, onboard-item-vehicle edges, and request-request edges;
trim the request-vehicle graph into partial request-vehicle graphs for each service vehicle, wherein the partial request-vehicle graphs comprise a subset of the nodes and the edges of the request-vehicle graphs;
encode the partial request-vehicle graphs through a graph neural network;
train the graph neural network to predict actions for each service vehicle, by maximizing an amount of requests served and minimizing total matching costs of request assignments to the service vehicles according to the map data, where each travel request and each service vehicle satisfy the constraints; and operate the service vehicles using instructions based on the actions.

15. The computing device of claim 14, wherein each travel request comprises a quantity of items to be picked up, a pickup time, a pickup location, a drop-off location, a desired travelling time of delivery, a pickup delay tolerance, a travel delay tolerance, and personal preferences associated with one or more delivery providers, vehicle configurations, community choices, payment methods, health and performance conditions of drivers of the service vehicles, or languages spoken by the drivers of the service vehicles.

16. The computing device of claim 15, wherein a total matching cost comprises all the service vehicles' pickup delays, travelling delays, and personal preference matching costs based on the personal preferences.

17. The computing device of claim 14, wherein the constraints comprise one or more of a maximum pickup delay tolerance, a maximum travel delay tolerance, and a capacity of each service vehicle.

18. The computing device of claim 14, wherein:
the request-vehicle edges indicate that a service vehicle can serve the travel request while satisfying the constraints;
the onboard-item-vehicle edges indicate that an item is onboard a service vehicle; and
the request-request edges indicate links between paired travel requests where, for each paired travel request, at least one service vehicle can perform the paired travel requests while satisfying the constraints.

19. The computing device of claim 14, wherein a corresponding partial request-vehicle graph for a service vehicle comprises the nodes and the edges indicating valid travel requests for that service vehicle, as an ego vehicle and one or more nearby service vehicles, as neighboring vehicles that can affect the ego vehicle's actions.

20. The computing device of claim 14, wherein the actions of the service vehicles comprise one or more of pickup, drop-off, and rebalancing, where a service vehicle with zero onboard item is assigned an action of pickup, drop-off, or rebalancing, and a service vehicle with one or more onboard items is assigned an action of pickup or drop-off.

* * * * *